United States Patent Office 3,429,442
Patented Feb. 25, 1969

3,429,442
PRESSURIZED DEVICE FOR WATER TREATMENT
Svatopluk Mackrle, Brno, Vladimír Mackrle, Prague, and Oldřich Dračka, Brno, Czechoslovakia, assignors to Cheskolovenska akademie věd, Prague, Czechoslovakia, a corporation of Czechoslovakia
Filed Sept. 24, 1964, Ser. No. 399,013
Claims priority, application Czechoslovakia, Oct. 8, 1963, 5,525/63; Oct. 15, 1963, 5,645/63
U.S. Cl. 210—202        2 Claims
Int. Cl. B01d 21/10, 29/08; C02c 1/26

ABSTRACT OF THE DISCLOSURE

A pressurized device for treatment of liquids containing several interrelated zones within a vessel in which a sedimentation and de-watering zone surrounds a sludge blanket zone which, in turn, surrounds a granular filter bed zone. The principal separation stage occurs in the fully fluidized sludge blanket with a secondary stage effected by the excess flow from the sludge blanket to form a sediment in a separate closed zone and further through a third stage wherein the separation is accomplished through filtering in the granular filter bed.

Figure 1:
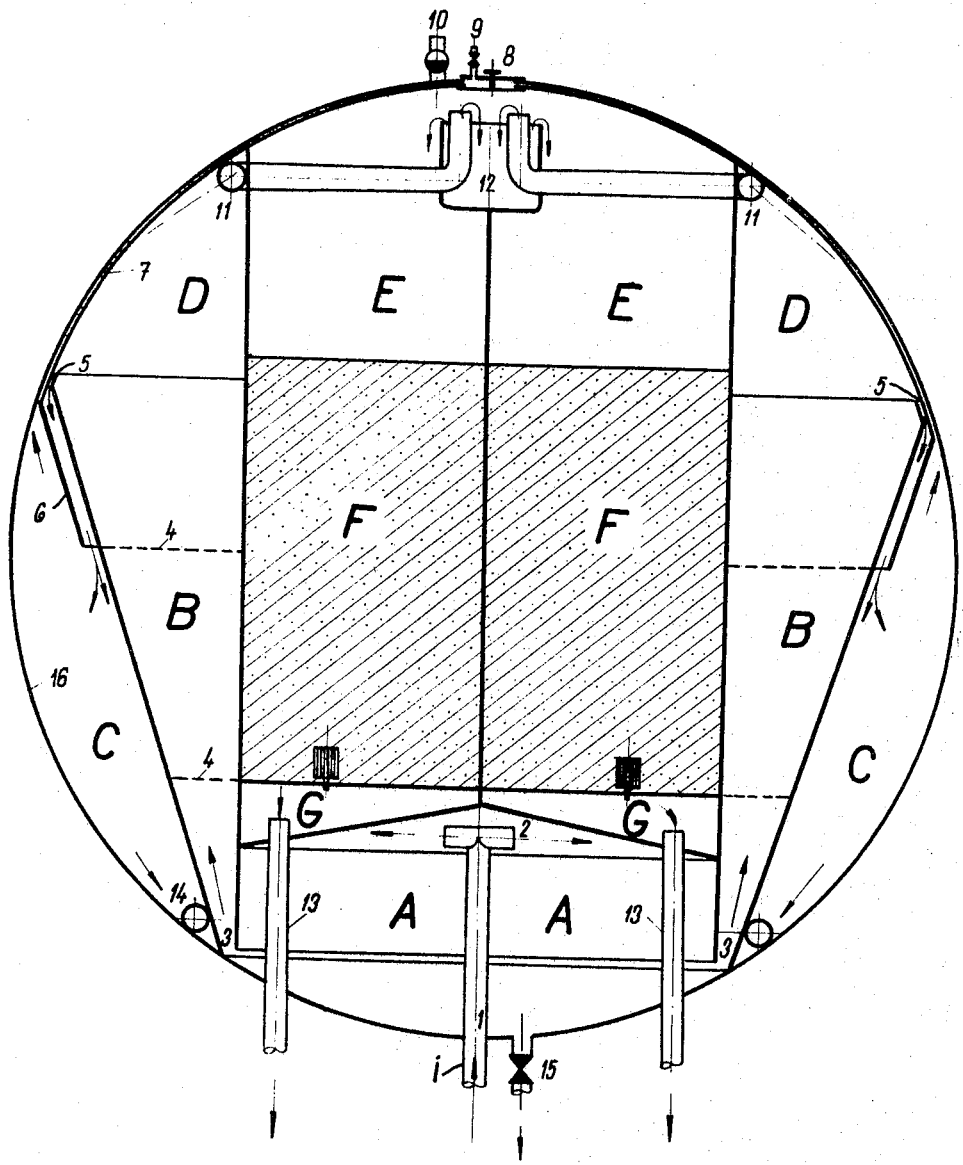

In the treatment of water by means of a sludge blanket and granular filter bed it is necessary to apply a sufficiently high pressure at the filter for its correct functioning. This pressure may be obtained either by provision of a sufficient head of water above the surface of the gravity filter, or by inserting a pumping device between the sludge blanket clarifier and the pressurised filter, or by designing the whole equipment to work under pressure.

To the best of our knowledge, all previous pressurised equipment for the treatment of water by means of a sludge blanket and granular filter bed incorporates in the first part of the process, for separation of the flocculated suspension, an imperfectly fluidized sludge blanket, where the principle of separation of the suspension is sedimentation in the sludge blanket zone. The imperfectly fluidized type of sludge blanket clarifier, in comparison with similar systems incorporating the principle of the fully fluidised bed, is relatively inefficient and produces a small output per unit area.

To the best of our knowledge, all previous equipment incorporating a fully fluidised sludge blanket characterised by the fact that the filtration phase in the sludge blanket is distinct from the sedimentation of excess sludge phase, was not designed for operation under pressure. For small installations of this type, in which the required height of the sludge blanket clarifier is small and does not allow the development of sufficient head in the filter, it is necessary either to insert a pumping device between the clarifier and filter, or to increase the height of the clarifier. The insertion of a pumping device, or the augmentation of the clarifier construction causes an increase in both investment and operational costs, the former solution unnecessarily complicating the operation of the equipment.

All these drawbacks may be overcome by using a method and device for pressurised water treatment according to our invention which incorporates a fully fluidized sludge blanket combined with a rapid filter, the whole housed in a single pressurised vessel. The characteristic of the sludge blanket used in this type of equipment is that the excess suspension is removed from the top of the sludge blanket and sedimentation of suspension in the sludge blanket zone is entirely prevented. Usually the concentration of flocculated suspension is greatest at the top of the sludge blanket from where the excess suspension is sucked through the apertures provided into the sedimentation and dewatering zone where the separation of suspension from water occurs by sedimentation. Fully fluidized conditions are attained in the sludge blanket by a uniform distribution of flow in the connecting apertures—between the coagulation and sludge blanket zones—of sufficient velocity to prevent any sedimentation in the sludge blanket zone.

For the treatment of water in special circumstances such as for use in boilers, it is necessary to use further technological processes besides those of coagulation and separation of the suspension. Such technological processes usually consist of filtration through specific filter media, for example, ion exchangers. According to our invention, such specific filtering apparatus could be installed to advantage between the double walls of the aforementioned pressure vessel.

Figure 2:
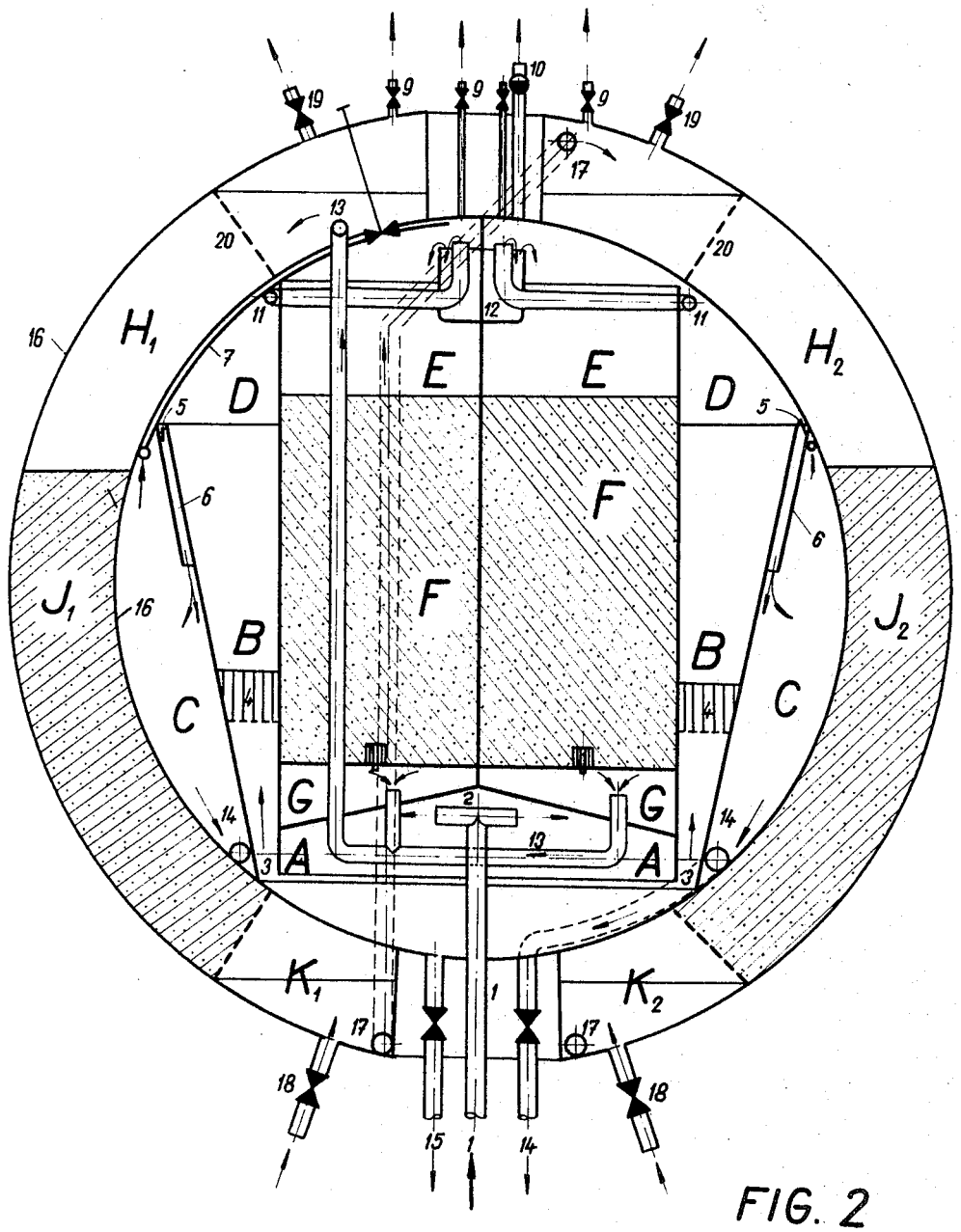

The accompanying drawings show in a diagrammatic representation an exemplary embodiment of our invention:

FIGURE 1 shows a vertical section of a pressurised device for the treatment of water for drinking purposes and FIGURE 2 shows a vertical section of a pressurised device for the treatment of water for industrial purposes.

Both pressurised water treatment devices incorporate filtration through a fully fluidized sludge blanket and filtration through a granular medium in a single pressure vessel.

In the device shown in FIG. 1, the coagulation zone A, the fully fluidized sludge blanket zone B, the sedimentation and dewatering zone C, the clarified water zone D, the expansion zone E, the zone of the granular filter bed F, and the underdrainage zone G, are all formed by the construction of partitions in the enveloping pressure vessel. The equipment also comprises the influent pipe 1, the distributing device 2, connecting apertures 3, homogenizing grids 4, sludge draw off apertures 5, deflecting baffle 6, collecting pipe 7 for settled water, regulating valve 8, air release valve 9, safety valve 10, delivery pipe 11, wash water collecting trough 12, clear water collecting pipe 13, sludge draw-off pipe 14, drainage pipe 15, and the enveloping wall of the pressure vessel 16.

The device shown in FIGURE 2 differs from that in FIGURE 1, in that it has two enveloping walls between which special filters are accommodated, which comprise special filter bed zones $J_1$, $J_2$ . . . containing e.g. ion exchange materials, expansion zones $H_1$, $H_2$ . . . and underdrainage zones $K_1$, $K_2$. . . . The zones of the filters have indices corresponding to those of the ion-exchange units which are connected in series. The ion-exchange filters are connected by pipes 17, which join zone K, of one filter to zone H, of the following filter. The ion exchange filters comprise a feed pipe 18 for both regenerating solutions and wash water, a draw off pipe 19 for regenerating solutions and wash water, and a perforated distributing plate 20.

The device so described functions in the following manner: the chemically dosed water enters through the influent pipe 1 and distributing device 2 into the coagulation zone A. The water enters zone B containing the fully fluidized sludge blanket through the connecting apertures 3. In the said sludge blanket the separation of suspension take place. The clarified water flows through the sludge blanket to the clarified water zone D from where it is led by means of delivery pipes 11 to the expansion zone E. Water containing an excess of fluocculated particles is sucked through the sludge draw-off apertures 5 and constrained by the deflecting baffle 6 to flow into the sedimentation and dewatering zone C. The settled water from this zone flows along the collecting pipe 7 through the regulating valve 8 into the same expansion zone E. The clarified water from the expansion zone E penetrates the granular filter bed zone F into the underdrainage zone G, from where it is drawn off through the clear water collecting pipe 13. The wash water collecting through 12 is used to collect the back-wash water. The pressure safety valve 10, prevents the enveloping wall of the pressure vessel 16 from being subjected to too high a pressure. The described forced flow of water in zones A, B, C, D, E, F, G eventually H, J, K is produced by the applied pressure of the water in the influent pipe 1.

The device for the treatment of industrial water operates in a similar fashion with the exeception that the filtered water from the underdrainage zone G is not drawn off but is led through a collecting pipe 13 into the first ion-exchange filter where the demineralisation process occurs, thence through the connecting pipes 17 to the expansion zone $H_2$ of the next ion-exchange filter where the procedure is repeated. After passing through all the ion exchange filters, the treatment is complete and the water leaves the equipment through the underdrainage system of the last ion-exchange filter.

The advantages of our invention may be enumerated as follows.

By combining the several phases of water treatment in one pressure vessel, the necessity to increase the pressure by pumping between the different phases is obviated. By the suitable arrangement of several technological phases of the process, a compact design of small volume is possible, which in turn allows the prefabrication or eventually mobilization of such plant:

What we claim is:
1. A pressurized device for the treatment of water, the combination comprising:
 (a) a closed vessel,
 (b) a coagulation zone at the bottom of said vessel,
 (c) a water inflow means for conveying water under pressure to said coagulation zone,
 (d) a fully fluidized sludge blanket zone extending upwardly adjacent to and surrounding said coagulation zone both zones communicating at their lower parts,
 (e) a sedimentation and dewatering zone surrounding said sludge blanket zone, both zones communicating in their upper parts,
 (f) a clarified water zone above said sludge blanket zone,
 (g) a granular filter bed zone located above said coagulation zone and inside said sludge blanket zone, and including an adjacent lower under drainage zone and an upper expansion zone, and
 (h) connecting means connecting the upper part of said sedimentation and dewatering zone and clarified water zone with said expansion zone.

2. A pressurized device according to claim 1, wherein said vessel is surrounded by a spaced enveloping wall member, a second granular bed zone positioned between said wall member and said vessel and containing an ion exchange material, a second expansion zone positioned above said second filter bed zone, an underdrainage zone positioned below said second filter bed zone, and means for conveying water from said first mentioned underdrainage zone to said second expansion zone.

References Cited

UNITED STATES PATENTS

| | | | |
|---|---|---|---|
| 2,772,235 | 11/1956 | Bookout et al. | 210—202 X |
| 2,860,786 | 11/1958 | Kittredge | 210—207 |
| 2,948,400 | 8/1960 | Hagen | 210—256 |
| 2,969,149 | 1/1961 | Mackrle et al. | 210—195 |

MICHAEL E. ROGERS, *Primary Examiner.*

U.S. Cl. X.R.

210—20, 207, 265